US012017250B2

(12) United States Patent
Ogita et al.

(10) Patent No.: US 12,017,250 B2
(45) Date of Patent: Jun. 25, 2024

(54) VIBRATION PRESENTATION APPARATUS AND VIBRATION PRESENTATION METHOD

(71) Applicant: SONY CORPORATION, Tokyo (JP)

(72) Inventors: Takeshi Ogita, Tokyo (JP); Osamu Ito, Tokyo (JP); Yohei Fukuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 770 days.

(21) Appl. No.: 17/250,192

(22) PCT Filed: Jun. 12, 2019

(86) PCT No.: PCT/JP2019/023368

§ 371 (c)(1),
(2) Date: Dec. 11, 2020

(87) PCT Pub. No.: WO2019/244755

PCT Pub. Date: Dec. 26, 2019

(65) Prior Publication Data

US 2021/0252553 A1 Aug. 19, 2021

(30) Foreign Application Priority Data

Jun. 21, 2018 (JP) ................................ 2018-117692

(51) Int. Cl.

| | |
|---|---|
| ***B06B 1/02*** | (2006.01) |
| ***A47C 7/62*** | (2006.01) |
| ***E04F 15/02*** | (2006.01) |

(52) U.S. Cl.

CPC .............. *B06B 1/0207* (2013.01); *A47C 7/62* (2013.01); *E04F 15/02* (2013.01)

(58) Field of Classification Search

CPC .... H04R 1/00; H04R 3/00; A47C 7/62; A47C 7/727; A47C 27/083; A47C 21/006;

(Continued)

(56) References Cited

U.S. PATENT DOCUMENTS

| | | | | |
|---|---|---|---|---|
| 11,169,609 B2 * | 11/2021 | Fukuma | .................. | H04R 5/02 |
| 2015/0201273 A1 * | 7/2015 | Ooi | .......................... | H04R 3/12 381/306 |

FOREIGN PATENT DOCUMENTS

| | | |
|---|---|---|
| CN | 204838781 U | 12/2015 |
| CN | 204862170 U | 12/2015 |

(Continued)

OTHER PUBLICATIONS

International Search Report and Written Opinion of PCT Application No. PCT/JP2019/023368, dated Aug. 27, 2019, 09 pages of ISRWO.

*Primary Examiner* — Tuan D Nguyen
(74) *Attorney, Agent, or Firm* — CHIP LAW GROUP

(57) ABSTRACT

A vibration presentation apparatus (100) including: a connection plate (120); and a plurality of cells (110) spaced apart from each other on the connection plate (120), in which the cells (110) each include: a vibration device (112); a first elastic body (113); a vibration presentation plate (111) on which the vibration device (112) and the first elastic body (113) are disposed; and a support member (114) that is interposed between the first elastic body (113) and the connection plate (120), and supports the vibration presentation plate (111) through the first elastic body (113).

17 Claims, 11 Drawing Sheets

(58) Field of Classification Search
CPC ..... A47C 7/72; B06B 1/0207; B06B 2201/70; B06B 1/04; E04F 15/02; E04F 2290/02
See application file for complete search history.

(56) References Cited

FOREIGN PATENT DOCUMENTS

| | | | |
|---|---|---|---|
| JP | 64-034100 | U | 3/1989 |
| JP | 05-085188 | U | 11/1993 |
| JP | 09-289696 | A | 11/1997 |
| JP | 2001-285975 | A | 10/2001 |
| JP | 2009-131740 | A | 6/2009 |
| JP | 2012-129575 | A | 7/2012 |

* cited by examiner

VIBRATION PRESENTATION APPARATUS AND VIBRATION PRESENTATION METHOD

CROSS REFERENCE TO RELATED APPLICATIONS

This application is a U.S. National Phase of International Patent Application No. PCT/JP2019/023368 filed on Jun. 12, 2019, which claims priority benefit of Japanese Patent Application No. JP 2018-117692 filed in the Japan Patent Office on Jun. 21, 2018. Each of the above-referenced applications is hereby incorporated herein by reference in its entirety.

TECHNICAL FIELD

The present disclosure relates to a vibration presentation apparatus and a vibration presentation method.

BACKGROUND ART

Heretofore, various techniques for presenting a tactile stimulus such as vibration to a user have been proposed. For example, Patent Document 1 below discloses a chair-type acoustic apparatus integrated with a vibration device.

CITATION LIST

Patent Document

Patent Document 1: Japanese Patent Application Laid-Open No. 2001-285975

SUMMARY OF THE INVENTION

Problems to be Solved by the Invention

However, in the acoustic apparatus disclosed in Patent Document 1 above, a plurality of vibration devices has been disposed on the same seat surface. Accordingly, there has been a possibility that respective vibrations output from the plurality of vibration devices may interfere with each other or noise may be caused by the interference, resulting in a deterioration in user experience.

Therefore, the present disclosure provides a mechanism capable of further improving user experience accompanied by vibration presentation.

Solutions to Problems

According to the present disclosure, provided is a vibration presentation apparatus including: a connection plate; and a plurality of cells spaced apart from each other on the connection plate, in which the cells each include: a vibration device; a first elastic body; a vibration presentation plate on which the vibration device and the first elastic body are disposed; and a support member that is interposed between the first elastic body and the connection plate, and supports the vibration presentation plate through the first elastic body.

Furthermore, according to the present disclosure, provided is a vibration presentation method to be performed by a processor, the method including: controlling vibration of a plurality of vibration devices included in a vibration presentation apparatus including: a connection plate; and a plurality of cells spaced apart from each other on the connection plate, in which the cells each include: the vibration device; a first elastic body; a vibration presentation plate on which the vibration device and the first elastic body are disposed; and a support member that is interposed between the first elastic body and the connection plate, and supports the vibration presentation plate through the first elastic body.

Effects of the Invention

As described above, according to the present disclosure, provided is a mechanism capable of further improving user experience accompanied by vibration presentation. Note that the above-described effect is not necessarily restrictive, and any of the effects set forth in the present specification or another effect that can be derived from the present specification may be achieved together with or instead of the above-described effect.

MODE FOR CARRYING OUT THE INVENTION

Figure 1:
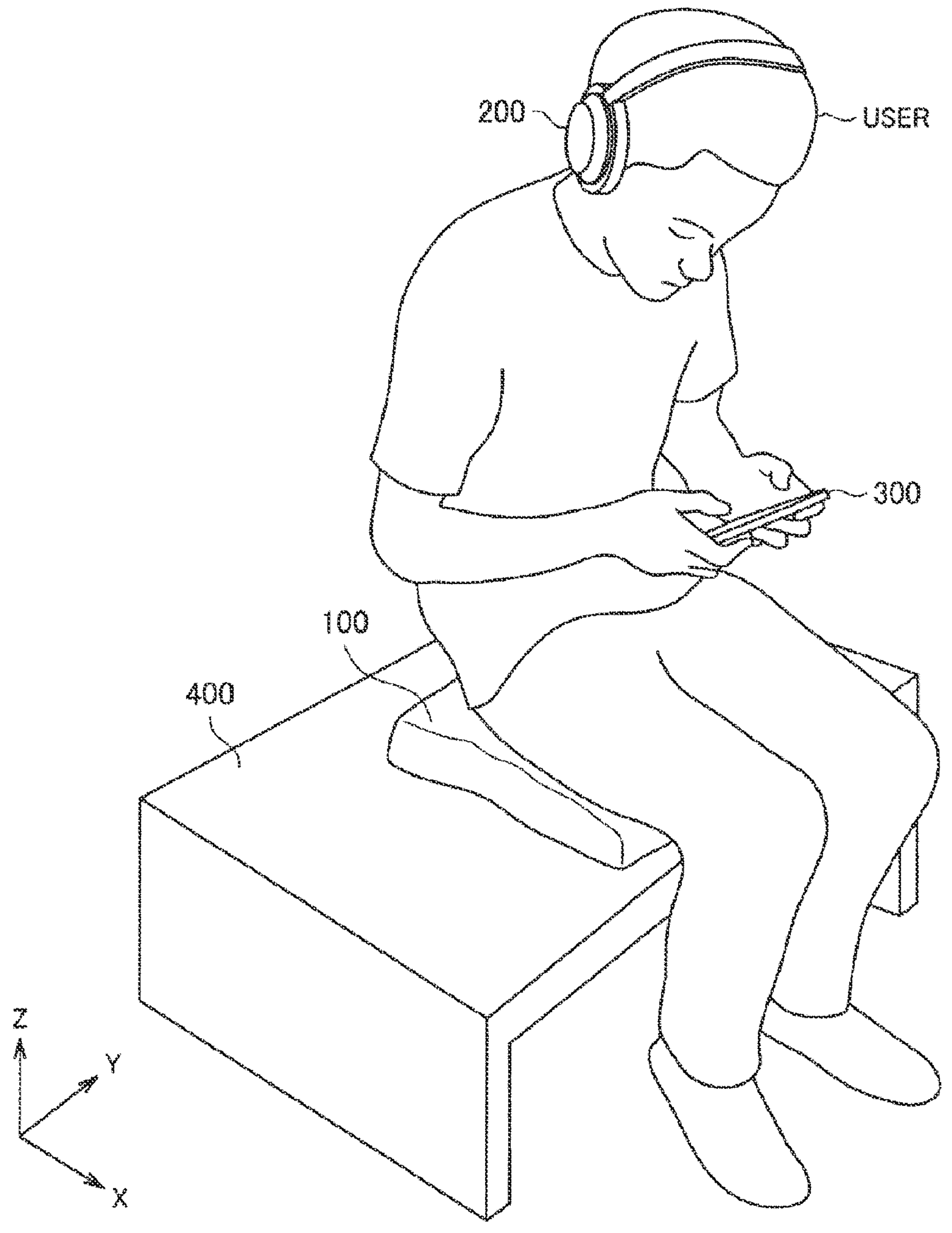
FIG. 1 is a diagram for providing an overview of a vibration presentation apparatus according to an embodiment of the present disclosure.

A preferred embodiment of the present disclosure will be described in detail below with reference to the accompanying drawings. Note that in the present specification and the drawings, the same reference numerals are assigned to constituent elements having substantially the same functional configuration, and duplicate description will be thus omitted.

Note that description will be provided in the following order.

1. Overview
2. Configuration Examples
2.1. First Configuration Example
2.2. Second Configuration Example
3. Vibration Presentation Process
4. Variations
5. Conclusion

1. Overview

First, an overview of a vibration presentation apparatus according to an embodiment of the present disclosure will be provided with reference to FIG. 1.

FIG. 1 is a diagram for providing an overview of a vibration presentation apparatus 100 according to the present embodiment. An example of a use case of the vibration presentation apparatus 100 is shown in FIG. 1. FIG. 1 shows an example in which a user is sitting on the vibration presentation apparatus 100 implemented as a cushion-type apparatus and placed on a chair 400. Furthermore, the user wears a sound output device 200 and is operating a terminal device 300. As shown in FIG. 1, a Z-axis direction is defined as a vertical direction (that is, a direction orthogonal to a seat surface), and a horizontal plane (that is, the seat surface) is defined by an X-axis and a Y-axis.

The vibration presentation apparatus 100 is an apparatus that presents vibration to a vibration presentation target. Any object such as a human, an animal, or a robot can be cited as the vibration presentation target. In the example shown in FIG. 1, the user is the vibration presentation target, and the following description is based on the assumption that the user is the vibration presentation target. The vibration presentation apparatus 100 includes a vibration device that outputs vibration, and presents the vibration to the user who is in contact with the vibration presentation apparatus 100. In the example shown in FIG. 1, the vibration presentation apparatus 100 brings vibration mainly to the buttocks of the user sitting on the vibration presentation apparatus 100. The vibration presentation apparatus 100 is connected by wire or wirelessly to the terminal device 300, and outputs vibration on the basis of data received from the terminal device 300.

Note that a member on which the vibration presentation apparatus 100 is placed, such as the chair 400 shown in FIG. 1, is hereinafter also referred to as a base. The base is not limited to the chair, and may be a floor surface, the ground, or the like. Furthermore, the vibration presentation apparatus 100 does not need to be fixed to the chair 400, and may be freely movable.

The sound output device 200 is a device that outputs a sound. In the example shown in FIG. 1, the sound output device 200 is a pair of headphones. Alternatively, the sound output device 200 may be implemented as earphones, a speaker, or the like. The sound output device 200 is connected by wire or wirelessly to the terminal device 300, and outputs a sound on the basis of data received from the terminal device 300.

The terminal device 300 is a device that controls the output of content. In the example shown in FIG. 1, the terminal device 300 is a smartphone. Alternatively, the terminal device 300 may be implemented as a personal computer (PC), a tablet terminal, a television set, or the like. Furthermore, the content refers to data including at least sound data, such as music or movies. The terminal device 300 transmits the content to the vibration presentation apparatus 100 and the sound output device 200, and performs a process of outputting the content in synchronization with these devices. For example, the terminal device 300 displays video on a display. In addition, the terminal device 300 causes the sound output device 200 to output sound synchronized with the video, and causes the vibration presentation apparatus 100 to output vibration synchronized with the sound. For example, as a result of outputting a low-pitched sound portion as vibration, it is possible to reinforce the low-pitched sound portion that is difficult to hear with bodily sensation and improve user experience.

Here, when vibration is presented by the vibration presentation apparatus 100, there is generated a sound of the vibration device being driven, and in addition, noise may be caused by the vibration. For example, in a case where a vibrating object comes into contact with another object that is not vibrating, noise may be caused by a collision between the vibrating object and the another object not vibrating. Such noise caused by vibration is hereinafter also referred to as vibration noise. Vibration noise may hinder presentation of vibration based on content to deteriorate user experience. Therefore, it is desirable to reduce vibration noise as far as possible.

Hereinafter, an example of a vibration presentation apparatus according to a comparative example will be described with reference to FIG. 2, and features of the vibration presentation apparatus 100 according to the present embodiment will be described in comparison with the comparative example.

Figure 2:
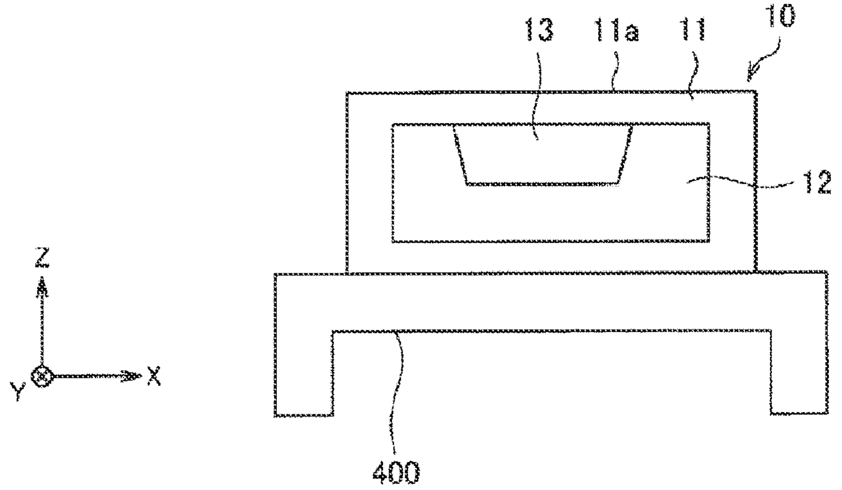
FIG. 2 is a diagram schematically showing an example of a vibration presentation apparatus according to a comparative example.

FIG. 2 is a diagram schematically showing an example of the vibration presentation apparatus according to the comparative example. FIG. 2 shows a cross-sectional view of a vibration presentation apparatus 10 according to the comparative example placed on the chair 400 as a base, taken along the vertical direction. As shown in FIG. 2, the vibration presentation apparatus 10 according to the comparative example includes a structural member 11 and a vibration device 13. The structural member 11 is hollow, and has an internal space 12. The vibration device 13 is disposed inside the internal space 12, on the back side of a top surface 11*a* of the structural member 11.

According to the vibration presentation apparatus 10 shown in FIG. 2, in a case where the vibration device 13 outputs vibration, the vibration is transmitted to the structural member 11, so that the vibration can be presented to a user in contact with the top surface 11*a* of the structural member 11. However, in a case where the vibration device 13 vibrates, the vibration is transmitted to the entire structural member 11. As a result, vibration noise is caused by a collision between the back side of the vibration presentation apparatus 10 (that is, a surface of contact with the chair 400) and the chair 400.

Furthermore, the vibration generated by the vibration device 13 is transmitted to the entire structural member 11. Therefore, supposing that the vibration presentation apparatus 10 includes a plurality of the vibration devices 13, when respective vibrations output from the vibration devices 13 are different, these vibrations interfere with each other. Therefore, it is difficult to present a plurality of different vibrations to the user, and the range of expression by vibrations is limited.

In view of such circumstances, the vibration presentation apparatus 100 according to the present embodiment has been proposed.

First, the vibration presentation apparatus 100 includes one or more anti-vibration members (at least any of a first elastic body 113, a second elastic body 130, or a fourth elastic body to be described later) between the vibration device and a surface of contact between the vibration presentation apparatus 100 and the base. Therefore, vibration generated by the vibration device is damped by the anti-vibration member before reaching the base. As a result, it is possible to prevent vibration noise caused by a collision between the back side of the vibration presentation apparatus 100 (that is, the surface of contact with the base) and the base.

Furthermore, the vibration presentation apparatus 100 may include a plurality of cells (cells 110 to be described later). A cell is a unitary structure including the vibration device. The vibration presentation apparatus 100 includes one or more anti-vibration members (at least one of the first elastic body 113 or the fourth elastic body to be described later) between the vibration device of one cell and the vibration device of another cell. Therefore, vibration generated by the vibration device in the one cell is damped by the anti-vibration member before reaching the another cell. As a result, vibrations from different cells are prevented from interfering with each other. Therefore, it becomes easy to present a plurality of different vibrations to the user, and the range of expression by vibrations is greatly improved.

Furthermore, the plurality of cells is provided such that the cells are spaced apart from each other. This enables prevention of vibration noise caused by a collision between the cells.

The overview of the vibration presentation apparatus 100 according to the present embodiment has been provided above. Hereinafter, details of the vibration presentation apparatus 100 will be described.

2. Configuration Examples

2.1. First Configuration Example

A first configuration example is a configuration example in which the vibration presentation apparatus 100 includes one cell. Hereinafter, the first configuration example of the vibration presentation apparatus 100 will be described with reference to FIGS. 3 to 5.

Figure 3:
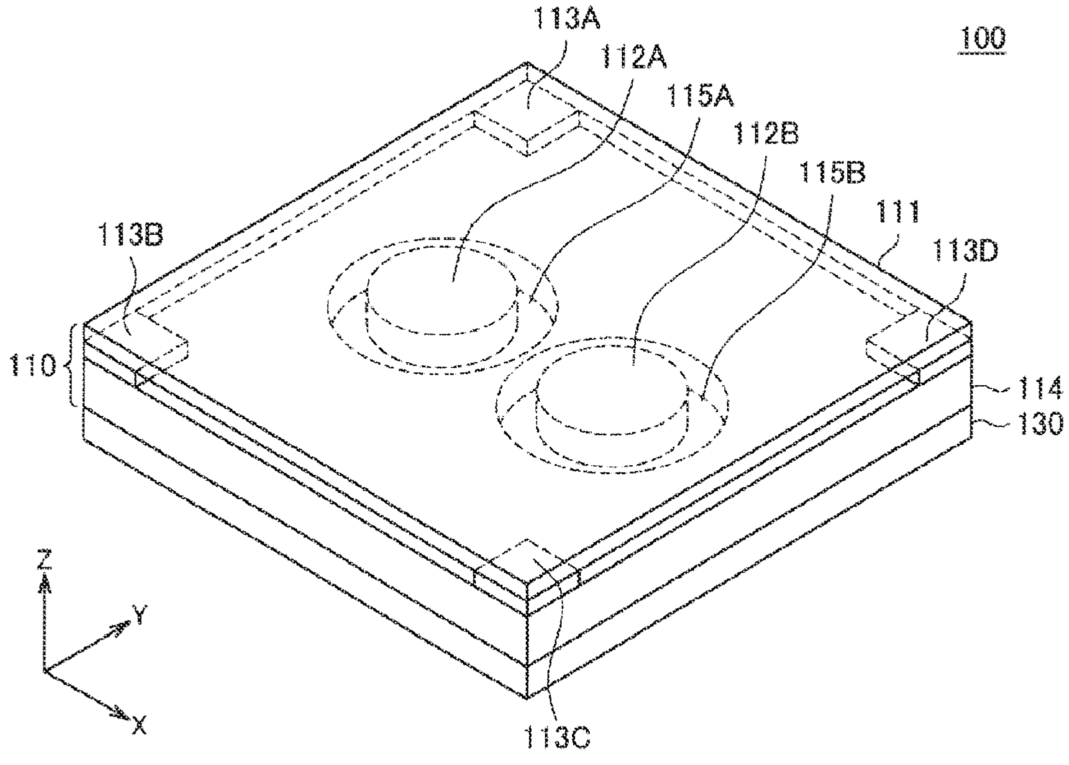
FIG. 3 is a perspective view of a first configuration example of the vibration presentation apparatus according to the present embodiment.
Figure 4:
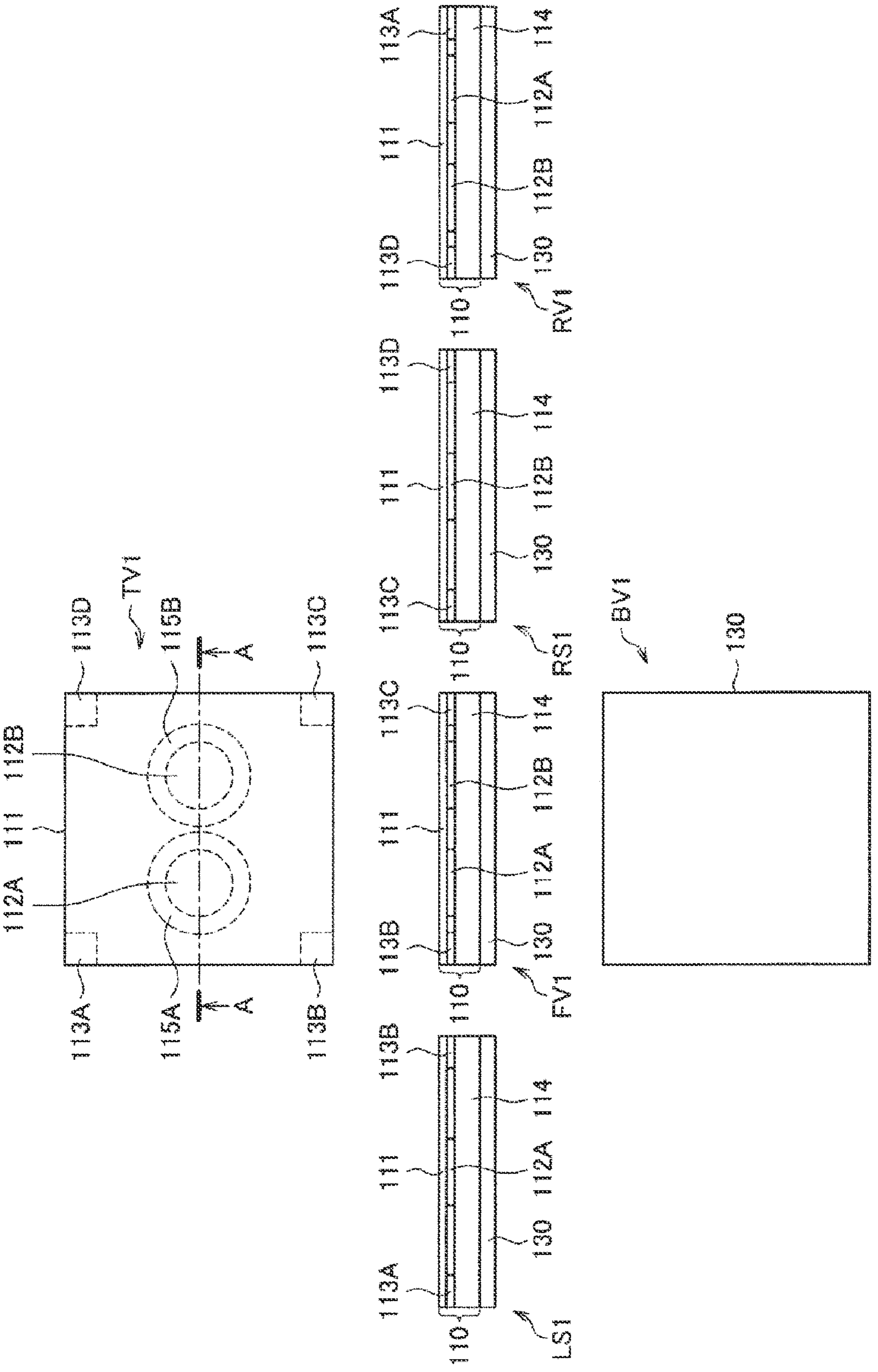
FIG. 4 is a six-view drawing of the vibration presentation apparatus shown in FIG. 3.
Figure 5:
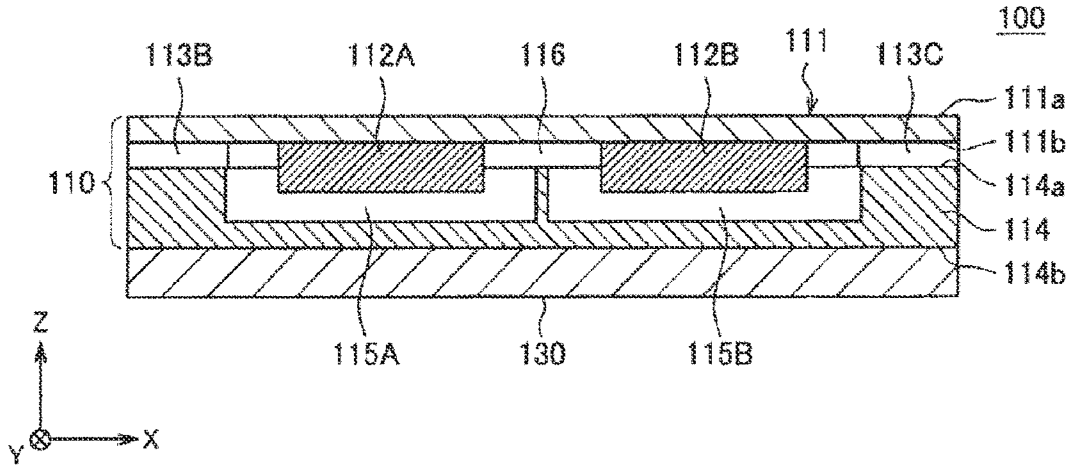
FIG. 5 is a cross-sectional view of the vibration presentation apparatus taken along line A-A shown in FIG. 4.

FIG. 3 is a perspective view of the first configuration example of the vibration presentation apparatus 100 according to the present embodiment. FIG. 4 is a six-view drawing of the vibration presentation apparatus 100 shown in FIG. 3. Specifically, FIG. 4 shows a left side view LS1, a front view FV1, a right side view RS1, a rear view RV1, a top view TV1, and a bottom view BV1 of the vibration presentation apparatus 100. FIG. 5 is a cross-sectional view of the vibration presentation apparatus 100 taken along line A-A shown in FIG. 4.

As shown in FIGS. 3 to 5, in the first configuration example, the vibration presentation apparatus 100 includes the cell 110 and the second elastic body 130. Then, the cell 110 includes a vibration presentation plate 111, vibration devices 112 (112A and 112B), the first elastic bodies 113 (113A to 113D), and a support member 114. Hereinafter, each structural member will be described in detail.

Vibration Presentation Plate 111

The vibration presentation plate 111 is a member that presents vibration to the user. The user comes into contact with a front surface 111*a* of the vibration presentation plate 111. For example, in a case where the vibration presentation apparatus 100 is configured as a cushion-type apparatus as shown in FIG. 1, the vibration presentation plate 111 corresponds to a seat surface. The vibration presentation plate 111 includes any material such as metal, plastic, or wood. It is desirable that the vibration presentation plate 111 be formed such that the material and thickness of the vibration presentation plate 111 provide strength sufficient to prevent the vibration presentation plate 111 from breaking even when the user comes into contact with the vibration presentation plate 111 (for example, the user gets on the vibration presentation plate 111).

Here, the positive side of the Z-axis direction corresponds to a direction in which vibration is presented by the vibration presentation plate 111 (also referred to as a vibration presentation direction). The vibration presentation direction here is a direction in which the user may exist. Hereinafter, the positive side of the Z-axis direction is also referred to as a front side, and the negative side of the Z-axis direction is also referred to as a back side. A direction in which the vibration device 112 vibrates may be identical to or different from the vibration presentation direction.

The vibration presentation plate 111 transmits vibration of the vibration device 112 to the user who has come into contact with the vibration presentation plate 111. The shape of the front surface 111*a* of the vibration presentation plate 111 shown in FIGS. 3 to 5 is a quadrangle. However, the front surface 111*a* may be formed in any shape such as a triangle, a polygon having five or more sides, or a circle. Furthermore, the surface 111*a* of the vibration presentation plate 111 shown in FIGS. 3 to 5 is a plane, the surface 111*a* being located in the vibration presentation direction. However, the surface 111*a* may be rounded or corrugated.

Vibration Device 112

The vibration device 112 is a device that outputs vibration. The vibration device 112 is implemented by, for example, an eccentric motor, a voice coil motor (VCM), or an actuator such as a linear resonant actuator (LRA). The vibration device 112 is disposed (for example, fixed) on the vibration presentation plate 111. This enables the vibration presentation plate 111 to vibrate when the vibration device 112 outputs vibration.

The vibration device 112 is disposed on a surface of the vibration presentation plate 111, the surface being on a side opposite to the vibration presentation direction. As shown in FIGS. 3 to 5, the vibration device 112 is disposed on a back surface 111*b* of the vibration presentation plate 111. With such a configuration, it is possible to minimize the distance between the vibration device 112 and the user when the user comes into contact with the front surface 111*a* of the vibration presentation plate 111. As a result, vibration generated by the vibration device 112 can be efficiently transmitted to the user.

One or more vibration devices 112 are disposed in one cell 110. In the example shown in FIGS. 3 to 5, two vibration devices 112 are disposed in one cell 110.

First Elastic Body 113

The first elastic body 113 is a member that damps vibration received from the outside. The first elastic body 113 is implemented by an elastic body such as rubber, gel, a damper, or a spring. The first elastic body 113 is disposed on the vibration presentation plate 111, and reduces vibration of the vibration presentation plate 111. For example, the first elastic body 113 absorbs the vibration energy of the vibration presentation plate 111 by elastic vibration made in accordance with the vibration of the vibration presentation plate 111. With this configuration, when the vibration presentation plate 111 vibrates, misalignment of the vibration presentation plate 111 and the first elastic body 113 is prevented, and the vibration device 112 is prevented from colliding with the support member 114. As a result, it is possible to prevent vibration noise caused by a collision between the vibration device 112 and the support member

114. Moreover, with this configuration, when the vibration presentation plate 111 vibrates, the vibration of the vibration presentation plate 111 is prevented from being transmitted to the support member 114. As a result, it is possible to prevent vibration noise caused by a collision between the back side of the vibration presentation apparatus 100 (that is, the surface of contact with the base) and the base.

The first elastic body 113 is disposed on the vibration presentation plate 111, on a side opposite to the vibration presentation direction. In the example shown in FIGS. 3 to 5, the vibration device 112 is disposed on the back surface 111*b* of the vibration presentation plate 111. With such a configuration, when the user comes into contact with the vibration presentation plate 111, the first elastic body 113 is subject to pressure (for example, body weight) that the vibration presentation plate 111 receives from the user and a reaction force from the base, acting in a direction toward the user. As a result, the vibration presentation plate 111 and the first elastic body 113 are brought into close contact with each other while being pressed, and it is thus possible to further prevent misalignment of the vibration presentation plate 111 and the first elastic body 113.

One cell 110 includes one or more first elastic bodies 113. In a case where one cell 110 includes a plurality of the first elastic bodies 113, it is desirable that the plurality of first elastic bodies 113 be spaced apart from each other. In the example shown in FIGS. 3 to 5, one cell includes four first elastic bodies 113 (113A to 113D), which are disposed at four corners on an X-Y plane of the vibration presentation plate 111 that is a quadrangle. With such a configuration, it is possible to reduce the amount of the first elastic body 113.

Support Member 114

The support member 114 is a member that is interposed between the first elastic body 113 and the second elastic body 130, and supports the vibration presentation plate 111 through the first elastic body 113. The support member 114 includes any material such as metal, plastic, or wood. As shown in FIG. 5, the support member 114 has recesses 115 (115A and 115B) surrounding the vibration devices 112. The recess 115 forms a space that is larger than the vibration device 112. With this configuration, the vibration device 112 is prevented from colliding with the support member 114 when the vibration presentation plate 111 vibrates. As a result, it is possible to prevent vibration noise caused by a collision between the vibration device 112 and the support member 114. Furthermore, the first elastic body 113 is disposed at an edge 114*a* of the support member 114, surrounding the recess 115. With this configuration, it is possible to maintain a space in which the vibration device 112 vibrates even when the user comes into contact with the vibration presentation plate 111 and elastic deformation of the first elastic body 113 is caused by the force (for example, body weight) that the vibration presentation plate 111 receives from the user.

As shown in FIG. 5, the cell 110 has an opening 116 that causes the space formed by the recess 115 of the support member 114 to communicate with the external space. As shown in FIG. 5, the opening 116 is formed as a result of providing the plurality of first elastic bodies 113 such that the first elastic bodies 113 are spaced apart from each other so as not to hermetically seal the space surrounded by the vibration presentation plate 111, the vibration device 112, the first elastic body 113, and the support member 114. With this configuration, heat generated by the vibration device 112 is released to the outside through the opening 116, so that it is possible to prevent the vibration device 112 from being subjected to high temperature.

Second Elastic Body 130

The second elastic body 130 is a member that damps vibration received from the outside. The second elastic body 130 is implemented by an elastic body such as rubber, gel, a damper, or a sponge. The second elastic body 130 is disposed on the back side of the cell 110. Specifically, the second elastic body 130 is disposed on a back surface 114*b* of the support member 114. With this configuration, even in a case where vibration of the vibration presentation plate 111 is transmitted to the support member 114 when the vibration presentation plate 111 vibrates, it is possible to prevent vibration noise caused by a collision between the back side of the vibration presentation apparatus 100 (that is, the surface of contact with the base) and the base.

Other

Although not shown in FIGS. 3 to 5, a third elastic body may be disposed on the front surface 111*a* of the vibration presentation plate 111. The third elastic body is a member that damps vibration received from the outside. The third elastic body is implemented by an elastic body such as rubber (particularly, urethane), gel, or a sponge. In a case where the third elastic body is disposed, the user comes into contact with the third elastic body. With this configuration, when the vibration presentation plate 111 vibrates, it is possible to prevent vibration noise caused by a collision between the vibration presentation plate 111 and the user. Furthermore, with this configuration, since the third elastic body and the user are in close contact with each other, misalignment of the vibration presentation plate 111 and the user is prevented when the vibration presentation plate 111 vibrates. For example, in a case where the vibration presentation apparatus 100 is configured as a cushion-type apparatus as shown in FIG. 1, the user's buttocks are in close contact with the third elastic body. This prevents the misalignment while preventing vibration noise from being caused. As a result, it becomes possible to improve user comfort.

2.2. Second Configuration Example

A second configuration example is a configuration example in which the vibration presentation apparatus 100 includes a plurality of cells. Hereinafter, the second configuration example of the vibration presentation apparatus 100 will be described with reference to FIGS. 6 to 8.

Figure 6:
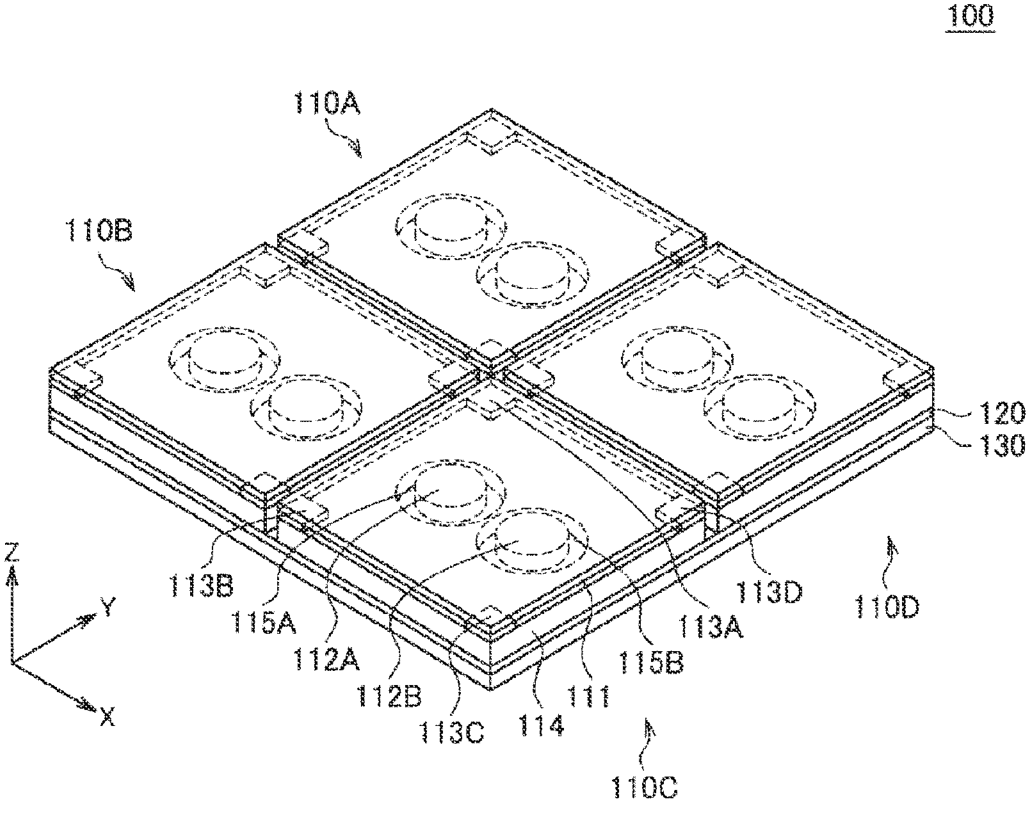
FIG. 6 is a perspective view of a second configuration example of the vibration presentation apparatus according to the present embodiment.
Figure 7:
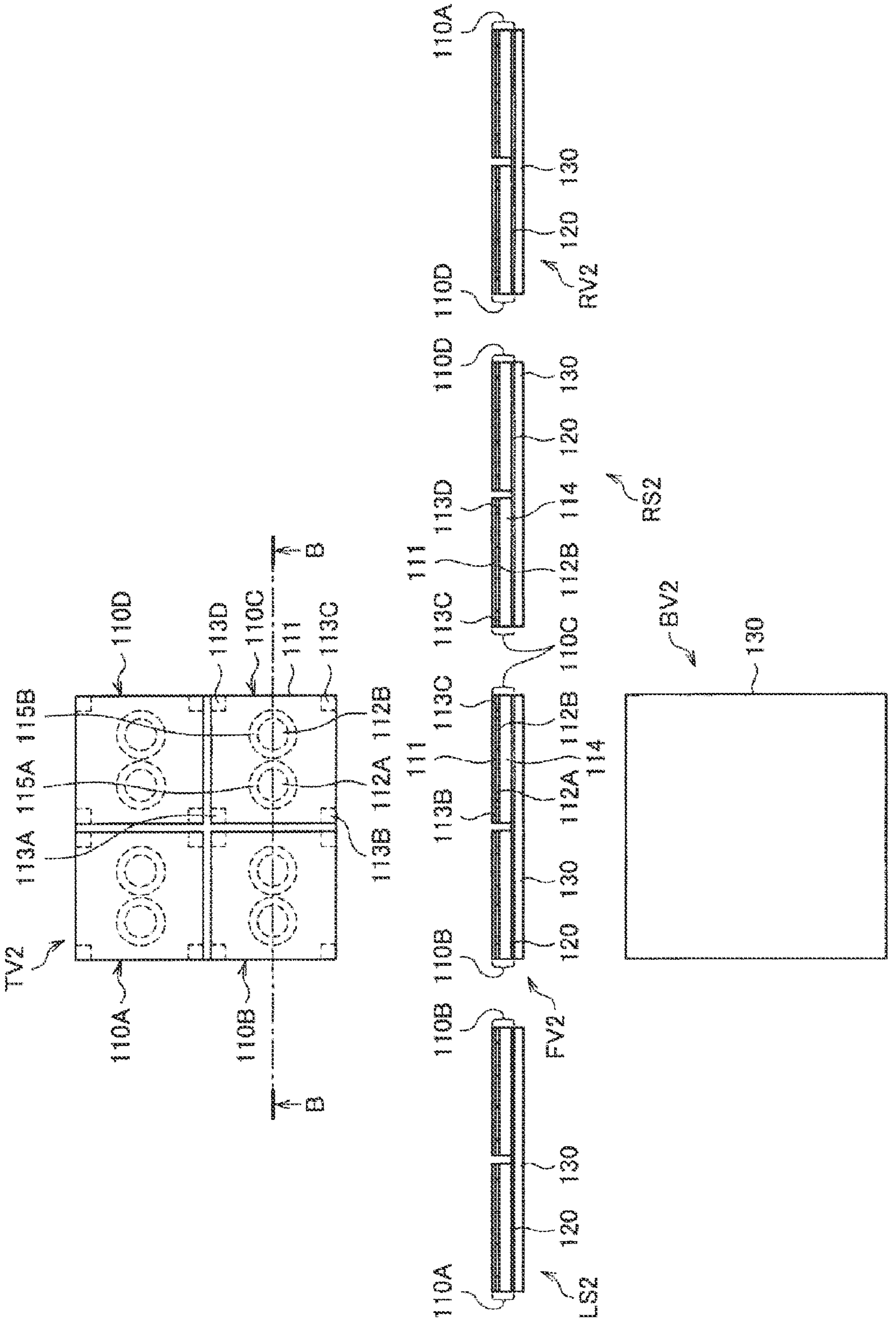
FIG. 7 is a six-view drawing of the vibration presentation apparatus shown in FIG. 6.
Figure 8:
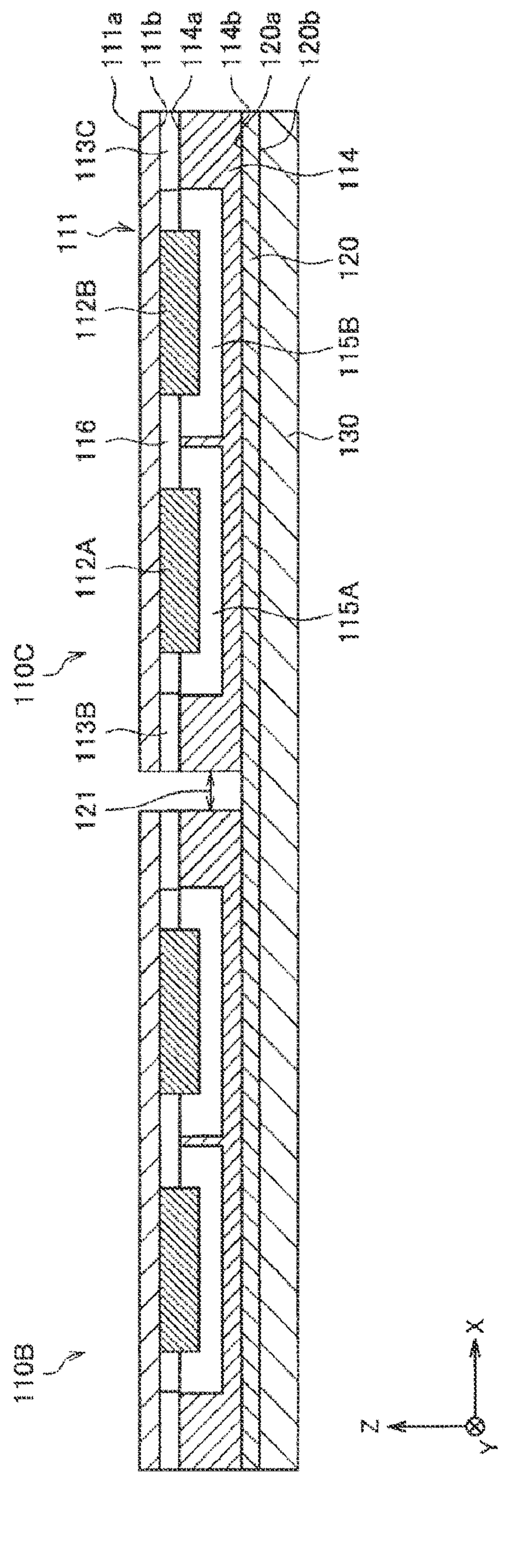
FIG. 8 is a cross-sectional view of the vibration presentation apparatus taken along line B-B shown in FIG. 7.

FIG. 6 is a perspective view of the second configuration example of the vibration presentation apparatus 100 according to the present embodiment. FIG. 7 is a six-view drawing of the vibration presentation apparatus 100 shown in FIG. 6. Specifically, FIG. 7 shows a left side view LS2, a front view FV2, a right side view RS2, a rear view RV2, a top view TV2, and a bottom view BV2 of the vibration presentation apparatus 100. FIG. 8 is a cross-sectional view of the vibration presentation apparatus 100 taken along line B-B shown in FIG. 7.

As shown in FIGS. 6 to 8, in the second configuration example, the vibration presentation apparatus 100 includes a plurality of the cells 110 (110A to 110D), a connection plate 120, and the second elastic body 130. Each of the plurality of cells 110 has a configuration similar to that of the cell 110 described above in the first configuration example. Note that reference numerals are assigned only to the cell 110C among the cells 110 in FIGS. 6 to 8, while reference numerals for the other cells 110A, 110B, and 110D, which are similar in configuration to the cell 110C, have been omitted. Hereinafter, each structural member will be described in detail. However, regarding the cell 110, only a difference from the first configuration example will be described.

Connection Plate 120

The connection plate 120 is a plate-like member on which the plurality of cells 110 is disposed. The connection plate 120 includes any material such as metal, plastic, or wood. It is desirable that the connection plate 120 be formed such that the material and thickness of the connection plate 120 provide strength sufficient to prevent the vibration presentation plate 111 from breaking even when the user comes into contact with the vibration presentation plate 111 (for example, the user gets on the vibration presentation plate 111).

The plurality of cells 110 is spaced apart from each other on the connection plate 120. For example, the plurality of cells 110 is disposed on the connection plate 120 such that the cells 110 are spaced apart from each other in the X-Y direction. An interval 121 between the cells 110 is set on the basis of the magnitude of vibration that can be output by the vibration device 112 of each cell 110 and the elasticity of the first elastic body 113. Specifically, the cells 110 are arranged at intervals of a value obtained by addition of a predetermined offset to the sum of maximum values of the amplitudes of the two adjacent vibration presentation plates 111 in the X-Y direction. With this configuration, a collision can be prevented even at the timing at which the two adjacent cells 110 come close to each other, so that it is possible to prevent vibration noise caused by a collision between the cells 110.

In the first configuration example, the support member 114 is interposed between the first elastic body 113 and the second elastic body 130. In contrast, in the present configuration example, the support member 114 is interposed between the first elastic body 113 and the connection plate 120, and supports the vibration presentation plate 111 through the first elastic body 113. Specifically, as shown in FIGS. 6 to 8, the first elastic body 113 is disposed at the edge 114*a* of the support member 114, surrounding the recess 115, and the connection plate 120 is disposed on the back surface 114*b* of the support member 114.

Furthermore, in the first configuration example, the second elastic body 130 is disposed on the back surface 114*b* of the support member 114. In contrast, in the present configuration example, the second elastic body 130 is disposed on a surface 120*b* of the connection plate 120, the surface 120*b* being on a side opposite to a surface 120*a* on which the cells 110 are disposed. To put it more simply, the second elastic body 130 is disposed on the back surface 120*b* of the connection plate 120. As a result, the second elastic body 130 is disposed on the back side of the cells 110. Therefore, as in the first configuration example, even in a case where vibration of the vibration presentation plate 111 is transmitted to the support member 114 and the connection plate 120 when the vibration presentation plate 111 vibrates, it is possible to prevent vibration noise caused by a collision between the back side of the vibration presentation apparatus 100 (that is, the surface of contact with the base) and the base.

Other

In the example shown in FIGS. 6 to 8, a plurality of the vibration presentation plates 111 is identical in size and shape. However, the present technology is not limited to such an example. For example, the plurality of vibration presentation plates 111 may be different from each other in size and shape. It is desirable that the size and shape of the vibration presentation plates 111 be designed according to the assumed state of contact between the plurality of vibration presentation plates 111 and the user. For example, the vibration presentation plate 111 that is expected to come into contact with an insensitive part such as buttocks may be designed to be large, and the vibration presentation plate 111 that is expected to come into contact with a sensitive part such as a hand may be designed to be small. As the vibration presentation plates 111 are smaller, the number of the vibration presentation plates 111 per unit area, that is, density can be increased, so that it is possible to improve the range of expression by vibration that can be presented to the user. In this respect, since the vibration presentation plate 111 that is expected to come into contact with a sensitive part such as a hand is designed to be small, it is possible to cause the user to more accurately perceive fine vibration presented by an area where the vibration presentation plates 111 are arranged with high density.

Although not shown in FIGS. 6 to 8, a fourth elastic body may be interposed between the support member 114 and the connection plate 120. The fourth elastic body is a member that damps vibration received from the outside. The fourth elastic body is implemented by an elastic body such as rubber, gel, a damper, or a spring. With this configuration, even in a case where vibration of the vibration presentation plate 111 is transmitted to the support member 114 when the vibration presentation plate 111 vibrates, the vibration is prevented from being transmitted to the connection plate 120. As a result, it is possible to prevent vibrations output from a plurality of the vibration devices 112 disposed in the different cells 110 from interfering with each other.

3. Vibration Presentation Process

Hereinafter, a vibration presentation process to be performed by the vibration presentation apparatus 100 will be described with reference to FIGS. 9 to 11.

Figure 9:
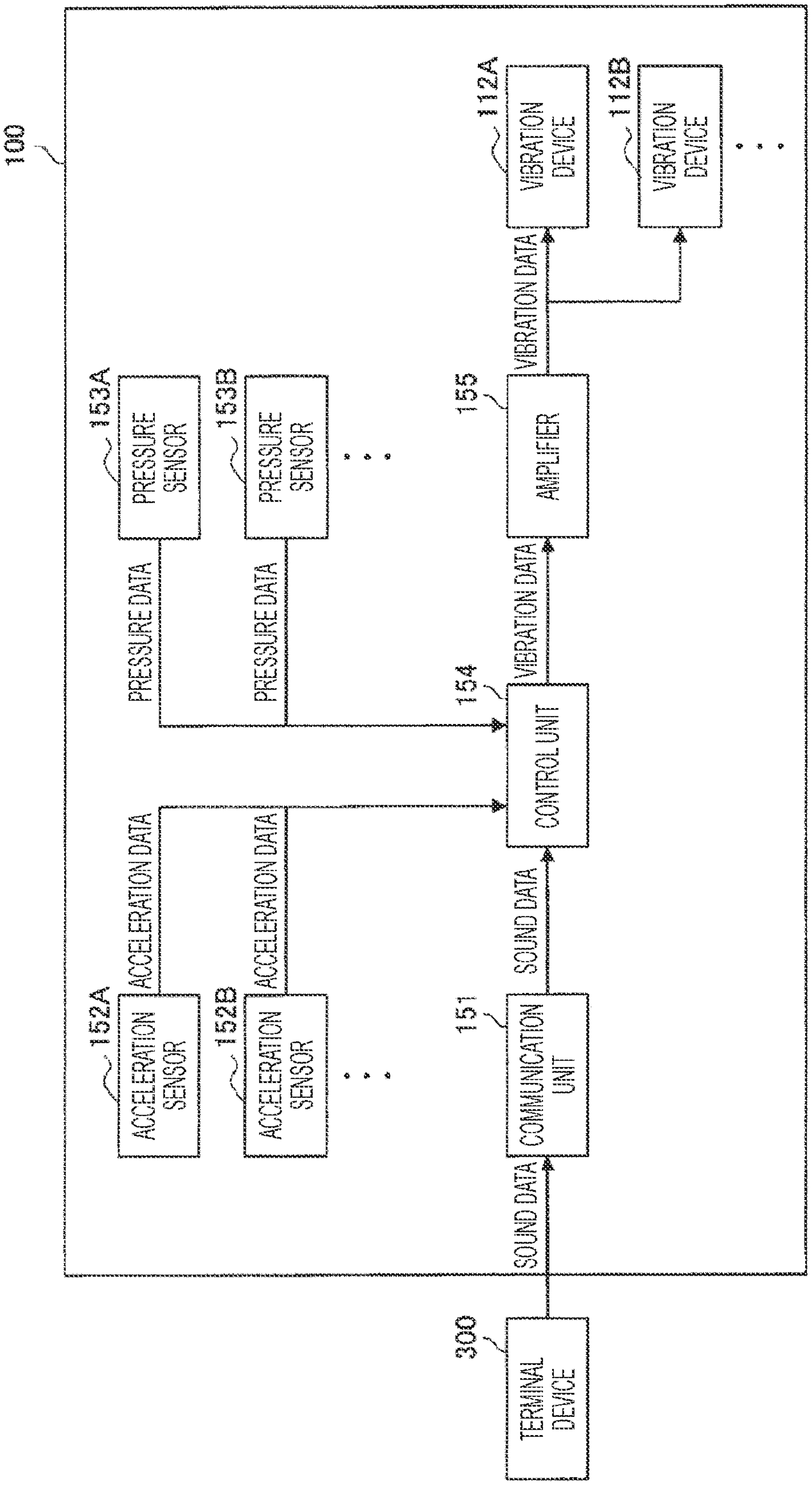
FIG. 9 is a block diagram showing an example of the functional configuration of the vibration presentation apparatus according to the present embodiment.

FIG. 9 is a block diagram showing an example of the functional configuration of the vibration presentation apparatus 100 according to the present embodiment. As shown in FIG. 9, the vibration presentation apparatus 100 includes a communication unit 151, acceleration sensors 152 (152A, 152B, and the like), pressure sensors 153 (153A, 153B, and the like), a control unit 154, an amplifier 155, and the vibration devices 112 (112A, 112B, and the like).

(Communication Unit 151)

The communication unit 151 has the function of transmitting/receiving information to/from another device by wire/wirelessly. The communication unit 151 communicates in accordance with any communication protocol such as a local area network (LAN), Universal Serial Bus (USB), a wireless LAN, Wi-Fi (registered trademark), or Bluetooth (registered trademark). The communication unit 151 transmits/receives information to/from the terminal device 300. For example, the communication unit 151 receives content data (for example, sound data) from the terminal device 300, and outputs the content data to the control unit 154.

(Acceleration Sensor 152)

The acceleration sensor 152 is a sensor that detects acceleration. The acceleration sensor 152 detects the acceleration of the vibration presentation plate 111. For example, the acceleration sensor 152 is disposed on the vibration presentation plate 111. Typically, vibration of the vibration presentation plate 111 changes depending on the state of contact between the vibration presentation plate 111 and the user, and vibration to be perceived by the user also changes. In this respect, the vibration presentation apparatus 100 can grasp vibration of the vibration presentation plate 111 on the basis of the acceleration of the vibration presentation plate

111, and can perform feedback control of the vibration. Note that the state of contact refers to, for example, the size of the area of contact between the vibration presentation plate 111 and the user and the strength of contact (that is, pressure). In a case where the vibration presentation apparatus 100 is a cushion-type apparatus, the state of contact can also be regarded as a position on which the user is sitting.

The vibration presentation apparatus 100 includes one or more acceleration sensors 152. One or more acceleration sensors 152 may be disposed in one cell 110. The state of contact between the vibration presentation plate 111 and the user may vary depending on positions on the X-Y plane of the vibration presentation plate 111. Therefore, it is desirable that a plurality of the acceleration sensors 152 be disposed at different positions on the X-Y plane in one cell 110. As a result, it becomes possible to grasp vibration of the vibration presentation plate 111 in detail, so that finer feedback control of vibration can be performed. Furthermore, in the second configuration example, the state of contact between the plurality of cells 110 and the user often differs between the plurality of cells 110. Therefore, it is desirable that one or more acceleration sensors 152 be disposed in each cell 110. As a result, it becomes possible to grasp vibration of the vibration presentation plate 111 for each cell 110, so that feedback control of vibration can be performed for each cell 110.

The acceleration sensor 152 outputs acceleration data as a detection result to the control unit 154.

(Pressure Sensor 153)

The pressure sensor 153 is a sensor that detects pressure. The pressure sensor 153 detects pressure that the vibration presentation plate 111 receives from the user. Typically, vibration of the vibration presentation plate 111 changes depending on the state of contact between the vibration presentation plate 111 and the user, and vibration to be perceived by the user also changes. In this respect, it is possible for the vibration presentation apparatus 100 to grasp the state of contact between the vibration presentation plate 111 and the user on the basis of the pressure detected by the pressure sensor 153. As a result, it is possible to control vibration of the vibration device 112 according to the state of contact.

The vibration presentation apparatus 100 includes one or more pressure sensors 153. One or more pressure sensors 153 may be disposed in one cell 110. The state of contact between the vibration presentation plate 111 and the user may vary depending on positions on the X-Y plane of the vibration presentation plate 111. Therefore, it is desirable that a plurality of the pressure sensors 153 be disposed at different positions on the X-Y plane in one cell 110. As a result, it becomes possible to grasp the state of contact between the vibration presentation plate 111 and the user in detail, so that finer vibration control can be performed. Furthermore, in the second configuration example, the state of contact between the plurality of cells 110 and the user often differs between the plurality of cells 110. Therefore, it is desirable that one or more pressure sensors 153 be disposed in each cell 110. As a result, it becomes possible to grasp in detail the state of contact between the vibration presentation plate 111 and the user for each cell 110, so that appropriate vibration control can be performed for each cell 110.

The pressure sensor 153 may detect pressure on the basis of deformation of the first elastic body 113. For example, the pressure sensor 153 detects that a higher pressure has been applied on the vibration presentation plate 111 as the degree of deformation of the first elastic body 113 increases, and that a lower pressure has been applied on the vibration presentation plate 111 as the degree of deformation of the first elastic body 113 decreases.

The pressure sensor 153 outputs pressure data as a detection result to the control unit 154.

(Control Unit 154)

The control unit 154 functions as an arithmetic processing unit and a control device, and controls overall operation in the vibration presentation apparatus 100 according to various programs. The control unit 154 is implemented by an electronic circuit such as a central processing unit (CPU) and a microprocessor. Note that the control unit 154 may include a read only memory (ROM) in which a program to be used, operation parameters, and the like are stored, and a random access memory (RAM) in which parameters and the like that change as appropriate are temporarily stored.

The control unit 154 has the function of controlling vibration of the vibration device 112. For example, the control unit 154 generates vibration data that are pieces of information for controlling vibration of the vibration device 112. The vibration data include at least information indicating characteristics such as the amplitude and frequency of vibration to be output from the vibration device 112. The vibration data may be a drive signal for driving the vibration device 112. The control unit 154 outputs the generated vibration data to the amplifier 155.

The control unit 154 controls vibration of the vibration device 112 on the basis of the content data (for example, sound data) received from the terminal device 300. For example, the control unit 154 generates vibration data on the basis of a predetermined frequency region in the sound data. The predetermined frequency region refers to, for example, a region corresponding to a low-pitched sound portion that is difficult for the user to hear.

The control unit 154 controls vibration of the vibration device 112 for each cell 110. The control unit 154 may cause the plurality of cells 110 to output the same vibration, may cause the plurality of cells 110 to output different vibrations, or may switch whether or not to output vibration for each cell 110. In addition, the control unit 154 may cause some of the plurality of cells 110 to vibrate, or can also present a feeling of movement to the user by, for example, changing the cells 110 that vibrate along a predetermined direction on the X-Y plane. With such vibration control for each cell 110, it is possible to improve the range of expression by vibration that can be presented to the user. Vibration control for each cell 110 will be described with reference to FIG. 10.

Figure 10:
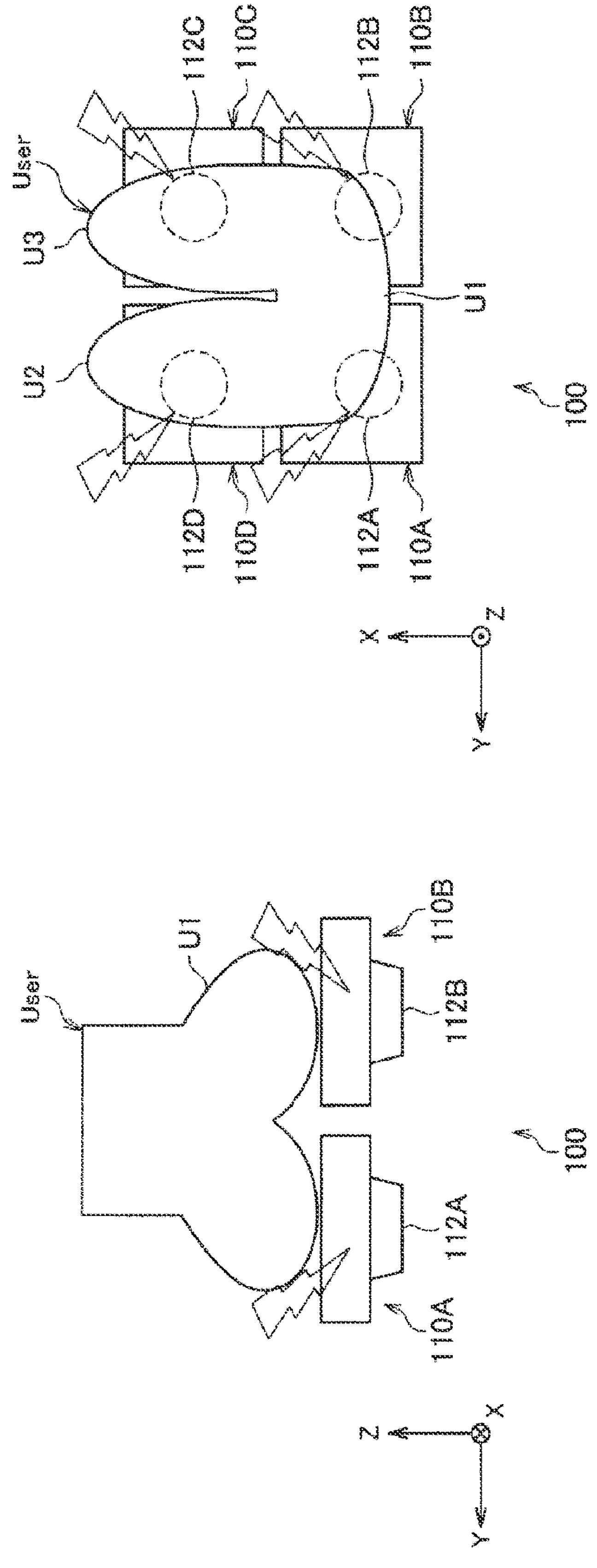
FIG. 10 is a diagram for describing an example of vibration to be presented by the vibration presentation apparatus according to the present embodiment.

FIG. 10 is a diagram for describing an example of vibration to be presented by the vibration presentation apparatus 100 according to the present embodiment. In the example shown in FIG. 10, the vibration presentation apparatus 100 includes four cells 110 (110A to 110D), and the vibration devices 112 (112A to 112D) are disposed such that each cell 110 includes one vibration device 112. A state of the user sitting on the vibration presentation apparatus 100 viewed from the back side is shown in the left part of FIG. 10, with the positive side of the X-axis set as the front side. A state of the lower body of the user, who is shown in the left part, viewed from above in the vertical direction is shown in the right part of FIG. 10. As shown in FIG. 10, the user's buttocks U1 are placed on the cells 110A and 110B, a left leg U2 is placed on the cell 110D, and a right leg U3 is placed on the cell 110C. In this case, the vibration presentation apparatus 100 may cause the respective vibration devices 112 disposed in the cells 110 to output the same vibration or output different vibrations.

On the basis of the state of contact between the vibration presentation plate 111 and the user, the control unit 154 controls vibration of the vibration device 112 included in the cell 110 including the vibration presentation plate 111. Typically, vibration of the vibration presentation plate 111 changes depending on the state of contact between the vibration presentation plate 111 and the user, and vibration to be perceived by the user also changes. In this respect, it is possible to cause the user to accurately perceive vibration to be perceived by the user, by causing vibration to be output according to the state of contact.

The control unit 154 may control vibration of the vibration device 112 included in each of the plurality of cells 110, on the basis of pressure that the vibration presentation plate 111 in each of the plurality of cells 110 receives from the user. Specifically, the control unit 154 may cause vibration to be output from the vibration device 112 included in the cell 110 including the vibration presentation plate 111 in contact with the user. For example, the control unit 154 determines that the user is in contact with the vibration presentation plate 111 in a case where a pressure detected by the pressure sensor 153 is equal to or greater than a predetermined threshold value, and in other cases, the control unit 154 determines that the user is not in contact with the vibration presentation plate 111. Then, the control unit 154 switches whether or not to vibrate the vibration device 112 of the cell 110 on the basis of the determination result. Specifically, the control unit 154 causes vibration to be output from the vibration device 112 included in the cell 110 of the vibration presentation plate 111 judged to be in contact with the user, and does not cause vibration to be output from the vibration devices 112 included in the other cells 110. Such switching enables at least the driving of the vibration device 112 not in contact with the user to be prevented, so that power consumption can be reduced. Furthermore, the control unit 154 may control the magnitude of vibration of the vibration device 112 included in the cell 110 on the basis of the magnitude of pressure that the vibration presentation plate 111 included in the cell 110 receives from the user. For example, the control unit 154 causes the vibration device 112 to vibrate with a larger amplitude as pressure that the vibration presentation plate 111 receives from the user increases, and causes the vibration device 112 to vibrate with a smaller amplitude as the pressure that the vibration presentation plate 111 receives from the user decreases. With such vibration control according to the pressure, it is possible to present the user with appropriate vibration according to the state of contact between the user and the vibration presentation plate 111 and the user's original weight. Vibration control according to pressure will be described with reference to FIG. 11.

Figure 11:
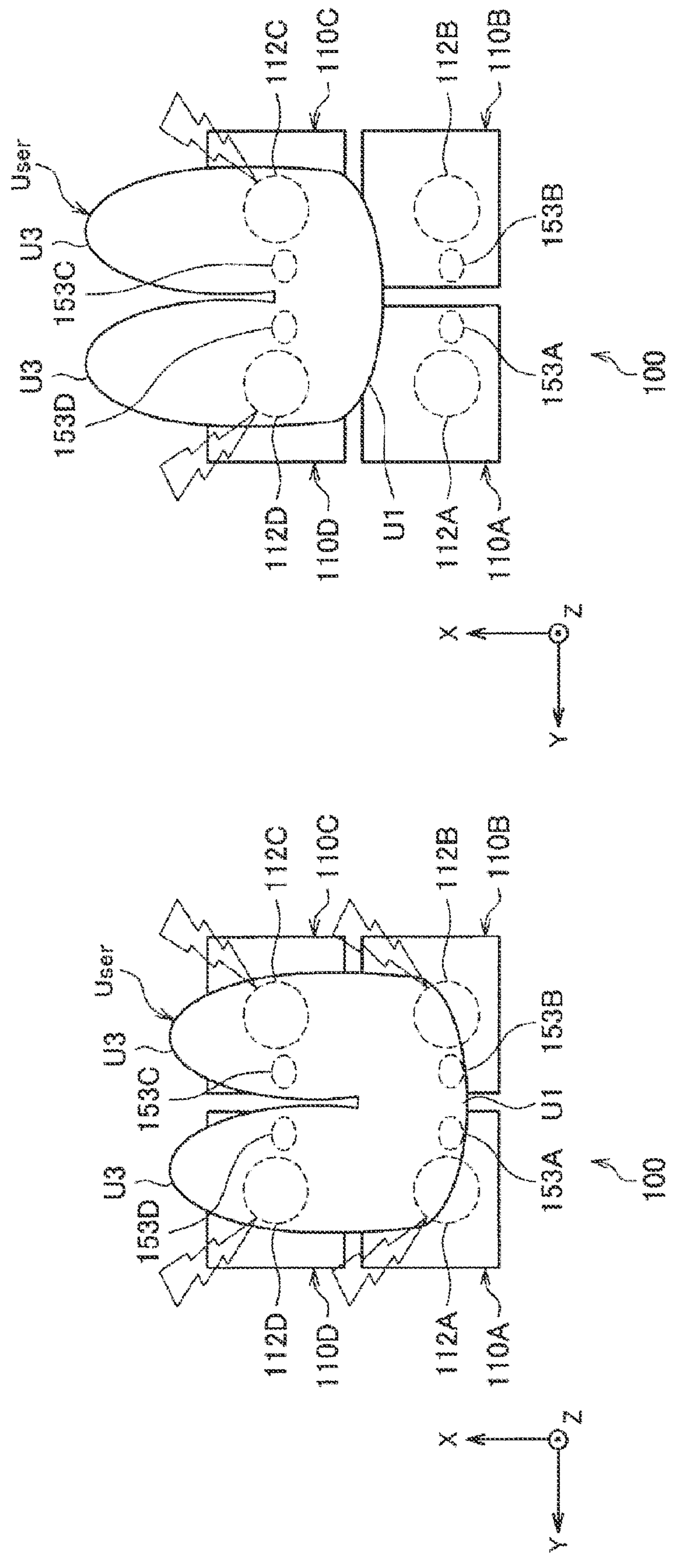
FIG. 11 is a diagram for describing an example of vibration to be presented by the vibration presentation apparatus according to the present embodiment.

FIG. 11 is a diagram for describing an example of vibration to be presented by the vibration presentation apparatus 100 according to the present embodiment. In the example shown in FIG. 11, the vibration presentation apparatus 100 includes four cells 110 (110A to 110D), and the vibration devices 112 (112A to 112D) and the pressure sensors 153 (153A to 153D) are disposed such that each cell 110 includes one vibration device 112 and one pressure sensor 153. A state of the lower body of the user sitting on the center of the vibration presentation apparatus 100 viewed from above in the vertical direction is shown in the left part of FIG. 11, with the positive side of the X-axis set as the front side. In the left part of FIG. 11, the user's buttocks U1 are placed on the cells 110A and 110B, the left leg U2 is placed on the cell 110D, and the right leg U3 is placed on the cell 110C. The vibration presentation apparatus 100 recognizes such a state of contact on the basis of results of detection performed by the pressure sensors 153A to 153D, and causes each of the vibration devices 112A to 112D included in the four cells 110 to output vibration. Meanwhile, a state of the lower body of the user sitting on the front half of the vibration presentation apparatus 100 viewed from above in the vertical direction is shown in the right part of FIG. 11, with the positive side of the X-axis set as the front side. In the right part of FIG. 11, the user's buttock U1 and the left leg U2 are placed on the cell 110D, and the user's buttock U1 and the right leg U3 are placed on the cell 110C. The vibration presentation apparatus 100 recognizes such a state of contact on the basis of the results of detection performed by the pressure sensors 153A to 153D, and causes vibration to be output from the vibration devices 112C and 112D included in the cells 110C and 110D in contact with the user. Moreover, in the example shown in the right part of FIG. 11, the user's weight (that is, pressure) applied on the cells 110C and 110D is larger than in the example shown in the left part of FIG. 11. Therefore, the vibration presentation apparatus 100 causes the vibration devices 112C and 112D to output vibration with a larger amplitude than in the example shown in the left part of FIG. 11.

The control unit 154 may control vibration of the vibration device 112 included in the cell 110, on the basis of the acceleration of the vibration presentation plate 111 included in the cell 110. For example, the control unit 154 corrects the vibration data such that vibration (frequency and amplitude) of the vibration presentation plate 111 indicated by the acceleration matches a target vibration (frequency and amplitude). The target vibration refers to, for example, vibration to be perceived by the user, which is vibration determined by content data. Note that in this context, the term "matching the target vibration" is a concept also including a difference from the target vibration being within a predetermined range. With such feedback control, it is possible to cause the user to accurately perceive vibration to be perceived by the user.

The control unit 154 may control vibration of the vibration device 112 included in each of the plurality of cells 110, on the basis of the magnitude of movement of the user. For example, the control unit 154 causes the vibration device 112 to vibrate with a larger amplitude as the user's movement is larger, and causes the vibration device 112 to vibrate with a smaller amplitude as the user's movement is smaller. Typically, the user is less likely to perceive vibration as the user's own movement is larger, and is more likely to perceive the vibration as the user's own movement is smaller. In this respect, it is possible to keep vibration to be perceived by the user constant by causing vibration to be output according to the magnitude of the movement. Note that the magnitude of the user's movement can be recognized on the basis of, for example, the time-series variation of acceleration detected by the acceleration sensor 152, the time-series variation of pressure detected by the pressure sensor 153, or a result of image recognition performed on a captured image of the user.

(Amplifier 155)

The amplifier 155 has the function of amplifying a signal. The amplifier 155 amplifies the vibration data (for example, drive signal) output from the control unit 154, and outputs the amplified vibration data to each vibration device 112.

Here, in a case where one cell 110 includes a plurality of the vibration devices 112, the plurality of vibration devices 112 included in the one cell 110 vibrates on the basis of the same drive signal. In other words, the control unit 154 generates the same vibration data (drive signal) for the vibration devices 112 included in the one cell 110, and outputs the same vibration data to the vibration devices 112 via the amplifier 155. As a result, the same vibration is output from the plurality of vibration devices 112 disposed in the same cell 110, that is, the same vibration presentation plate 111. Thus, vibrations output from the plurality of vibration devices 112 are prevented from interfering with each other on the same vibration presentation plate 111.

Furthermore, in a case where one cell 110 includes a plurality of the vibration devices 112, a plurality of the vibration devices 112 included in different cells 110 can vibrate on the basis of different drive signals. In other words, the control unit 154 may generate different vibration data (drive signals) for the vibration devices 112 included in the different cells 110 and output the vibration data to the vibration devices 112 via the amplifier 155. As a result, different vibrations can be output from the different cells 110, so that it is possible to improve the range of expression by vibration that can be presented to the user.

(Vibration Device 112)

The vibration device 112 outputs vibration by being driven on the basis of the drive signal output from the amplifier 155. Details of the vibration device 112 are as described above with reference to, for example, FIGS. 3 to 8.

(Processing Flow)

Figure 12:
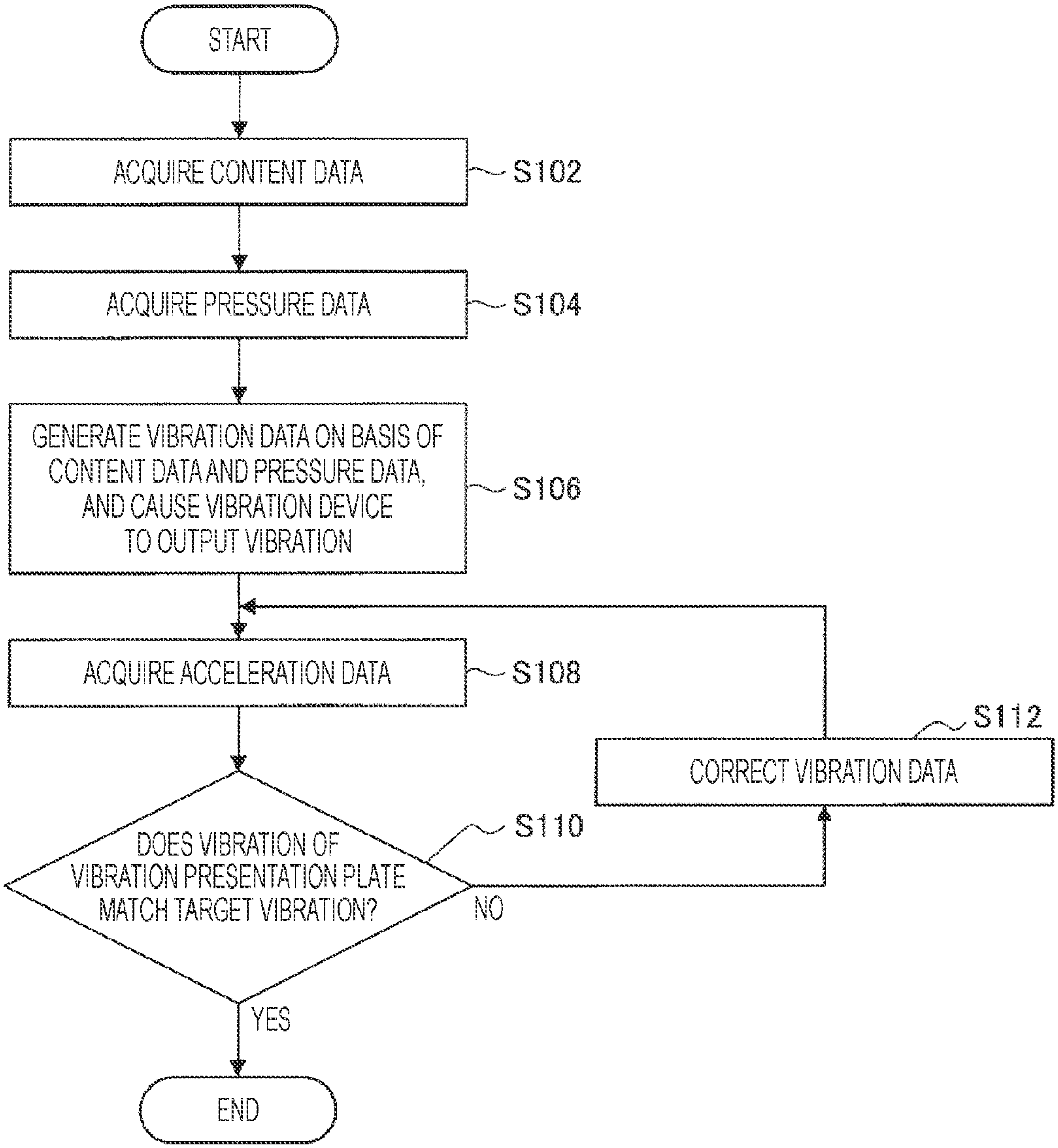
FIG. 12 is a flowchart for describing an example of the flow of a vibration presentation process to be performed by the vibration presentation apparatus according to the present embodiment.

Hereinafter, an example of the flow of the vibration presentation process will be described with reference to FIG. 12. FIG. 12 is a flowchart for describing an example of the flow of the vibration presentation process to be performed by the vibration presentation apparatus 100 according to the present embodiment.

As shown in FIG. 12, first, the control unit 154 acquires content data (for example, sound data) (step S102). Next, the control unit 154 acquires pressure data from the pressure sensor 153 (step S104). Then, the control unit 154 generates vibration data on the basis of the content data and the pressure data, and causes the vibration device 112 to output vibration (step S106). Specifically, on the basis of the content data and the pressure data, the control unit 154 generates vibration data (drive signal) for causing the vibration device 112 disposed in each of one or more cells 110 included in the vibration presentation apparatus 100 to vibrate, and outputs the generated vibration data to the amplifier 155. The amplifier 155 amplifies the vibration data, and outputs the amplified vibration data to the corresponding vibration device 112. As a result, the vibration device 112 outputs vibration by being driven according to the drive signal.

Subsequently, the control unit 154 acquires acceleration data from the acceleration sensor 152 (step S108). Next, the control unit 154 determines whether or not vibration of the vibration presentation plate 111 indicated by the acceleration data matches the target vibration (step S110). In a case where the vibration of the vibration presentation plate 111 does not match the target vibration (step S110/NO), the control unit 154 corrects the vibration data, and adjusts vibration to be output from the vibration device 112 (step S112). The control unit 154 repeats the processing of steps S108 to S112 until the vibration of the vibration presentation plate 111 matches the target vibration, and in a case where the vibration of the vibration presentation plate 111 matches the target vibration (step S110/YES), the adjustment processing ends.

4. Variations

The vibration presentation apparatus 100 may be implemented in various forms other than the cushion-type apparatus. For example, the vibration presentation apparatus 100 may be implemented in various forms such as a chair, a desk, a sofa, a bench, a bed, a car, a motorcycle, and a wearable device. Furthermore, the vibration presentation apparatus 100 may be implemented as a floor or a wall. For instance, an example in which the vibration presentation apparatus 100 is implemented as a floor will be described with reference to FIG. 13.

Figure 13:
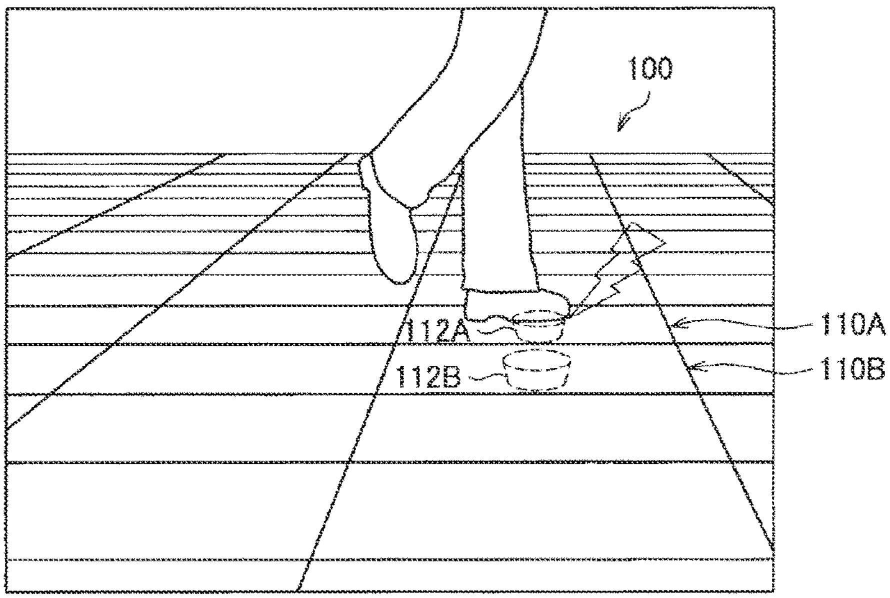
FIG. 13 is a diagram for describing an example in which the vibration presentation apparatus according to the present embodiment is implemented as a floor.

FIG. 13 is a diagram for describing an example in which the vibration presentation apparatus 100 according to the present embodiment is implemented as a floor. In the example shown in FIG. 13, a vibration presentation apparatus 100 is implemented as a tiled floor, and each tile corresponds to a cell 110. In the example shown in FIG. 13, the vibration presentation apparatus 100 includes a plurality of the cells 110 (110A, 110B, and the like), and vibration devices 112 (112A, 112, and the like) are disposed such that each cell 110 includes one vibration device 112. For example, in order to present vibration to a user walking on the vibration presentation apparatus 100, the vibration presentation apparatus 100 vibrates the vibration device 112 of the cell 110 on which the user's foot is placed. In the example shown in FIG. 13, since the user's foot is placed on the cell 110A, the vibration presentation apparatus 100 vibrates the vibration device 112. As a result, the vibration presentation apparatus 100 can present the user with a feeling of, for example, walking on snow or water.

5. Conclusion

The embodiment of the present disclosure has been described above in detail with reference to FIGS. 1 to 13. As described above, the vibration presentation apparatus 100 according to the present embodiment includes the connection plate 120 and the plurality of cells 110 spaced apart from each other on the connection plate 120. Then, the cell 110 includes the vibration device 112, the first elastic body 113, the vibration presentation plate 111, and the support member 114. The vibration device 112 and the first elastic body 113 are disposed on the vibration presentation plate 111. The support member 114 is interposed between the first elastic body 113 and the connection plate 120, and supports the vibration presentation plate 111 through the first elastic body 113. First, the cells 110 are spaced apart from each other on the connection plate 120. Therefore, even in a case where the vibration device 112 of each cell 110 vibrates, occurrence of collision between the cells 110 is prevented, and vibration noise caused by the collision is prevented. Furthermore, the support member 114 supports the vibration presentation plate 111 through the first elastic body 113. Therefore, when the vibration presentation plate 111 vibrates, the vibration device 112 is prevented from colliding with the support member 114 and vibration noise caused by the collision is prevented. As described above, in the vibration presentation apparatus 100 according to the present embodiment, generation of vibration noise is prevented, so that user experience accompanied by vibration presentation can be further improved.

The preferred embodiment of the present disclosure has been described above in detail with reference to the accompanying drawings. However, the technical scope of the present disclosure is not limited to such examples. It will be apparent to a person having ordinary skill in the art of the present disclosure that various modifications or alterations can be conceived within the scope of the technical idea described in the claims. It is understood that, of course, such modifications or alterations are also within the technical scope of the present disclosure.

Note that the devices described in the present specification may be implemented as a single device, or some or all of the devices may be implemented as separate devices. For example, in the functional configuration example of the vibration presentation apparatus 100 shown in FIG. 9, the control unit 154 may be provided in a device such as a server connected to the communication unit 151, the acceleration sensor 152, the pressure sensor 153, the amplifier 155, and the vibration device 112 via a network or the like. Furthermore, for example, at least two of the vibration presentation apparatus 100, the sound output device 200, and the terminal device 300 shown in FIG. 1 may be implemented as a single device. For example, the vibration presentation apparatus 100 may include a function as the sound output device 200 and/or a function as the terminal device 300.

Furthermore, a series of processes to be performed by each device described in the present specification may be implemented by use of any of software, hardware, and a combination of software and hardware. Programs forming the software are stored in advance in, for example, storage media (non-transitory media) provided inside or outside each device. Then, for example, when being executed by a computer, each program is loaded into a RAM and executed by a processor such as a CPU. Examples of the storage media described above include a magnetic disk, an optical disk, a magneto-optical disk, and a flash memory. Furthermore, the above-described computer programs may be delivered via, for example, a network without use of the storage media.

Furthermore, the processing described by use of the flowchart in the present specification need not necessarily be performed in the shown order. Some process steps may be performed in parallel. Furthermore, additional process steps may be adopted, and some process steps may be omitted.

Furthermore, the effects described in the present specification are merely explanatory or illustrative, and not restrictive. That is, the technology according to the present disclosure can achieve other effects obvious to those skilled in the art from descriptions in the present specification, together with or instead of the above-described effects.

Note that the following configurations are also within the technical scope of the present disclosure.

(1)

A vibration presentation apparatus including:

a connection plate; and a plurality of cells spaced apart from each other on the connection plate, in which the cells each include:

a vibration device;

a first elastic body;

a vibration presentation plate on which the vibration device and the first elastic body are disposed; and a support member that is interposed between the first elastic body and the connection plate, and supports the vibration presentation plate through the first elastic body.

(2)

The vibration presentation apparatus according to (1) above, in which the vibration device and the first elastic body are disposed on a surface of the vibration presentation plate, the surface being on a side opposite to a vibration presentation direction.

(3)

The vibration presentation apparatus according to (1) or (2) above, in which a plurality of the first elastic bodies included in one of the cells is spaced apart from each other.

(4)

The vibration presentation apparatus according to any one of (1) to (3) above, in which the support member has a recess surrounding the vibration device, and the cell has an opening that causes a space formed by the recess to communicate with an external space.

(5)

The vibration presentation apparatus according to any one of (1) to (4) above, in which the cell includes a pressure sensor that detects a pressure that the vibration presentation plate receives from a vibration presentation target.

(6)

The vibration presentation apparatus according to (5) above, in which the pressure sensor detects the pressure on the basis of deformation of the first elastic body.

(7)

The vibration presentation apparatus according to any one of (1) to (6) above, in which a second elastic body is disposed on a surface of the connection plate, the surface being on a side opposite to a surface on which the cells are disposed.

(8)

The vibration presentation apparatus according to any one of (1) to (7) above, in which a third elastic body is disposed on a surface of the vibration presentation plate, the surface being located in a vibration presentation direction.

(9)

The vibration presentation apparatus according to any one of (1) to (8) above, further including:

a control unit that controls vibration of the vibration device included in the cell including the vibration presentation plate on the basis of a state of contact between the vibration presentation plate and a vibration presentation target.

(10)

The vibration presentation apparatus according to (9) above, in which the control unit controls vibration of the vibration device included in each of a plurality of the cells on the basis of a pressure that the vibration presentation plate receives from the vibration presentation target in each of the plurality of cells.

(11)

The vibration presentation apparatus according to (10) above, in which the control unit causes the vibration device to output vibration, the vibration device being included in the cell including the vibration presentation plate in contact with the vibration presentation target.

(12)

The vibration presentation apparatus according to any one of (9) to (11) above, in which the cell further includes an acceleration sensor that detects an acceleration of the vibration presentation plate, and the control unit controls vibration of the vibration device included in the cell on the basis of the acceleration of the vibration presentation plate included in the cell.

(13)

The vibration presentation apparatus according to any one of (9) to (12) above, in which the control unit controls vibration of the vibration device included in each of a plurality of the cells on the basis of a magnitude of movement of the vibration presentation target.

(14)

The vibration presentation apparatus according to any one of (1) to (13) above, in which a plurality of the vibration devices included in one of the cells vibrates on the basis of the same drive signal, and a plurality of the vibration devices included in the different cells is capable of vibrating on the basis of different drive signals.

(15)

A vibration presentation method to be performed by a processor, the method including:

controlling vibration of a plurality of vibration devices included in a vibration presentation apparatus including:

a connection plate; and a plurality of cells spaced apart from each other on the connection plate, in which the cells each include:

the vibration device;

a first elastic body;

a vibration presentation plate on which the vibration device and the first elastic body are disposed; and a support member that is interposed between the first elastic body and the connection plate, and supports the vibration presentation plate through the first elastic body.

REFERENCE SIGNS LIST

100 Vibration presentation apparatus
110 Cell
111 Vibration presentation plate
112 Vibration device
113 First elastic body
114 Support member
115 Recess
116 Opening
120 Connection plate
121 Interval
130 Second elastic body
151 Communication unit
152 Acceleration sensor
153 Pressure sensor
154 Control unit
155 Amplifier
200 Sound output device
300 Terminal device
400 Chair

The invention claimed is:

1. A vibration presentation apparatus comprising:

a connection plate; and a plurality of cells spaced apart from each other on the connection plate, wherein each of the plurality of the cells include:

a vibration device;

a first elastic body;

a vibration presentation plate on which the vibration device and the first elastic body are disposed;

a support member that is interposed between the first elastic body and the connection plate, and supports the vibration presentation plate through the first elastic body; and a control unit that controls vibration of the vibration device on a basis of a state of contact between the vibration presentation plate and a vibration presentation target, wherein the vibration presentation plate presents the vibration to the vibration presentation target.

2. The vibration presentation apparatus according to claim 1, wherein the vibration device and the first elastic body are disposed on a surface of the vibration presentation plate, the surface being on a side opposite to a vibration presentation direction.

3. The vibration presentation apparatus according to claim 1, wherein a plurality of the first elastic bodies included in one of the plurality of the cells is spaced apart from each other.

4. The vibration presentation apparatus according to claim 1, wherein the support member has a recess surrounding the vibration device, and each cell of the plurality of the cells has an opening that causes a space formed by the recess to communicate with an external space.

5. The vibration presentation apparatus according to claim 1, wherein each cell of the plurality of the cells includes a pressure sensor that detects a pressure that the vibration presentation plate receives from the vibration presentation target.

6. The vibration presentation apparatus according to claim 5, wherein the pressure sensor detects the pressure on a basis of deformation of the first elastic body.

7. The vibration presentation apparatus according to claim 1, wherein a second elastic body is disposed on a surface of the connection plate, the surface being on a side opposite to a surface on which the plurality of the cells are disposed.

8. The vibration presentation apparatus according to claim 1, wherein a third elastic body is disposed on a surface of the vibration presentation plate, the surface being located in a vibration presentation direction.

9. The vibration presentation apparatus according to claim 1, wherein the control unit controls vibration of the vibration device included in each of the plurality of the cells on a basis of a pressure that the vibration presentation plate receives from the vibration presentation target in each of the plurality of the cells.

10. The vibration presentation apparatus according to claim 9, wherein the control unit causes the vibration device to output the vibration, the vibration device being included in each cell of the plurality of cells including the vibration presentation plate in contact with the vibration presentation target.

11. The vibration presentation apparatus according to claim 1, wherein each cell of the plurality of cells further includes an acceleration sensor that detects an acceleration of the vibration presentation plate, and the control unit controls the vibration of the vibration device included in each cell of the plurality of cells on a basis of the acceleration of the vibration presentation plate included in each of the plurality of cells.

12. The vibration presentation apparatus according to claim 1, wherein the control unit controls the vibration of the vibration device included in each of the plurality of the cells on a basis of a magnitude of movement of the vibration presentation target.

13. The vibration presentation apparatus according to claim 1, wherein a plurality of the vibration devices included in one of the plurality of the cells vibrate on a basis of a same drive signal, and a plurality of the vibration devices included in different cells of the plurality of the cells are capable of vibrating on a basis of different drive signals.

14. The vibration presentation apparatus according to claim 1, wherein the support member has a recess surrounding the vibration device and the recess forms a space that is larger than the vibration device, and wherein the recess is surrounded by the first elastic body.

15. The vibration presentation apparatus according to claim 1, wherein a fourth elastic body is disposed between the support member and the connection plate.

16. The vibration presentation apparatus according to claim 1, wherein the first elastic body is disposed at an edge of the support member.

17. A vibration presentation method to be performed by a processor, the method comprising:

controlling, by a control unit, vibration of a plurality of vibration devices included in a vibration presentation apparatus including:

a connection plate; and a plurality of cells spaced apart from each other on the connection plate, wherein each of the plurality of the cells include:

a vibration device of the plurality of vibration devices;

a first elastic body;

a vibration presentation plate on which the vibration device and the first elastic body are disposed; and a support member that is interposed between the first elastic body and the connection plate, and supports the vibration presentation plate through the first elastic body, wherein the control unit controls the vibration of the vibration device on a basis of a state of contact between the vibration presentation plate and a vibration presentation target, and wherein the vibration presentation plate presents the vibration to the vibration presentation target.

* * * * *